June 18, 1935.   W. H. LEDBETTER   2,005,550
TRACTOR WHEEL
Filed April 27, 1929   3 Sheets-Sheet 2
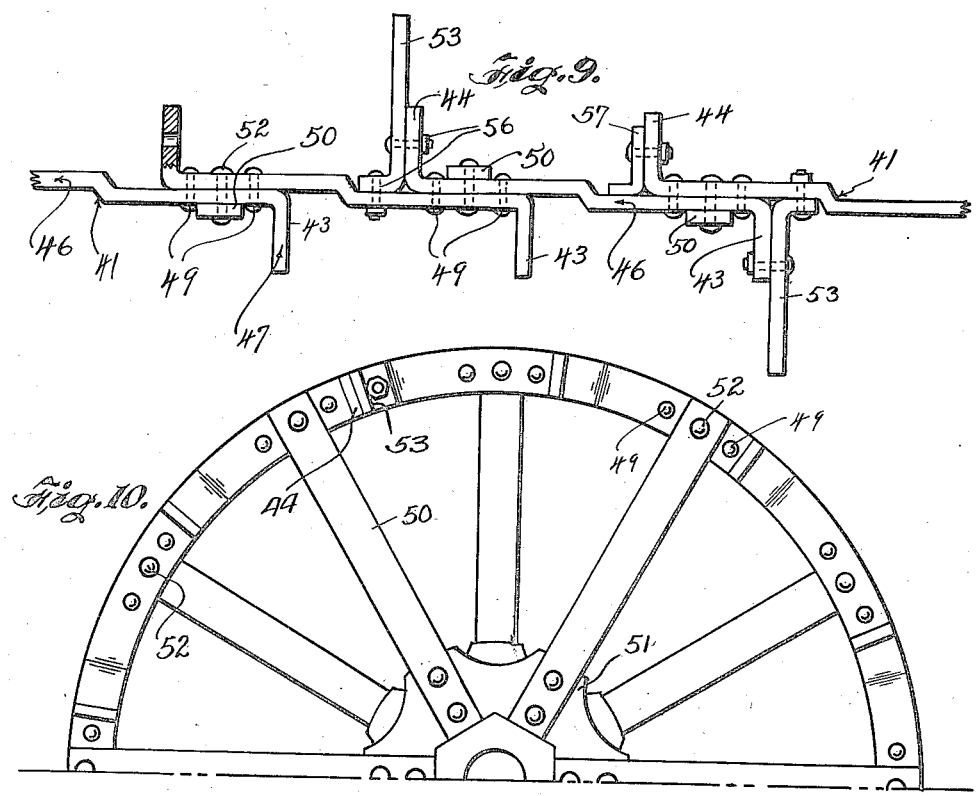
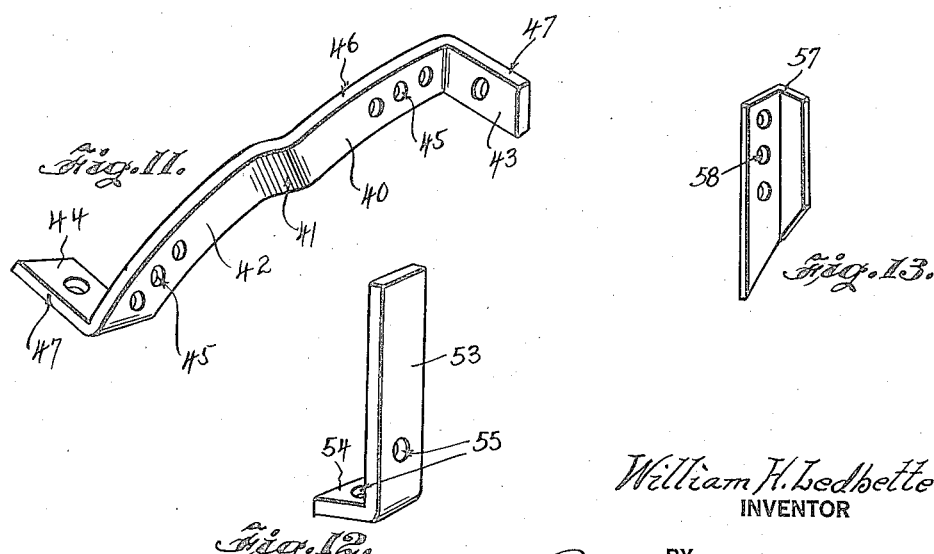
William H. Ledbetter,
INVENTOR
BY
Cohleber + Ledbetter
ATTORNEYS

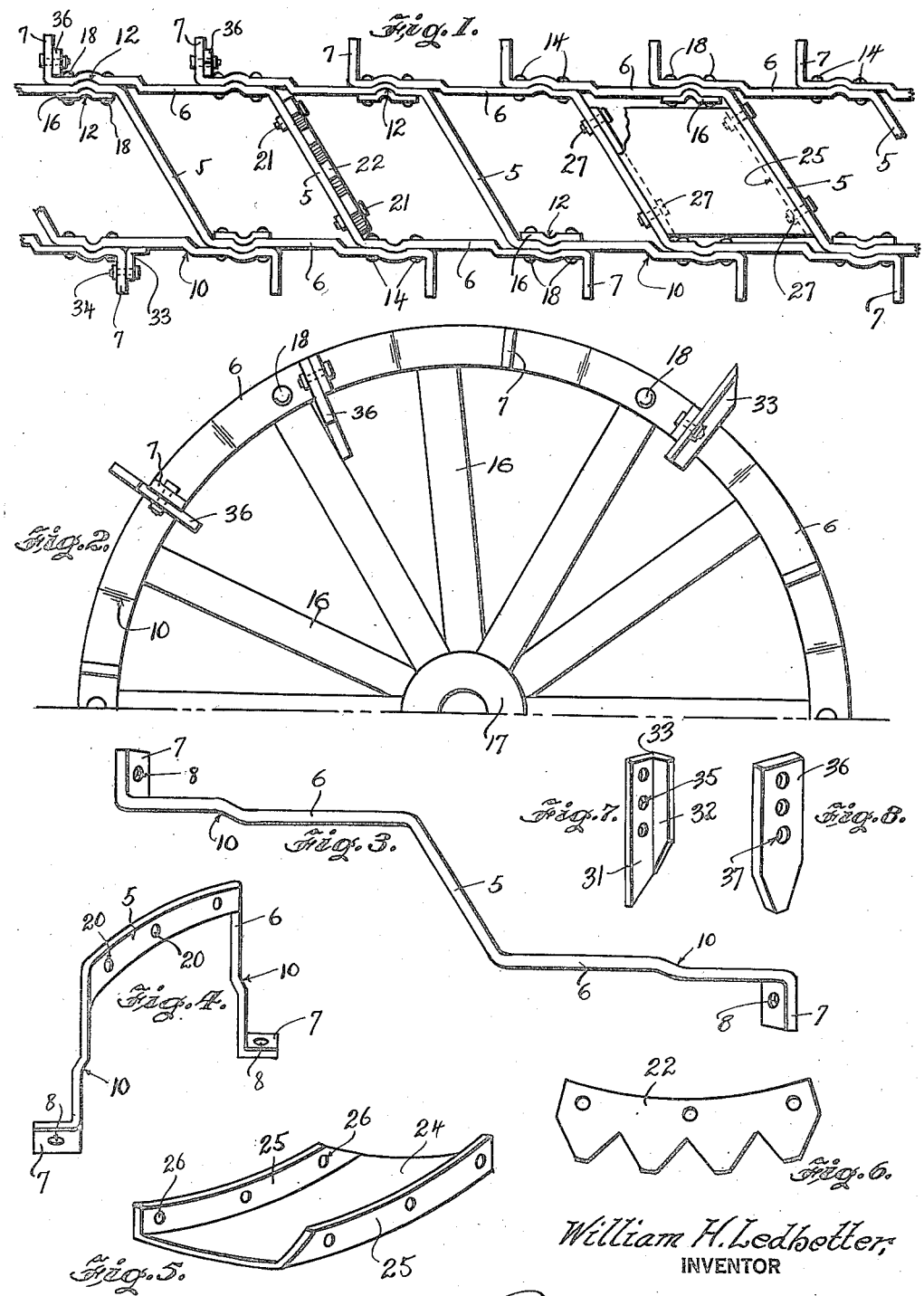

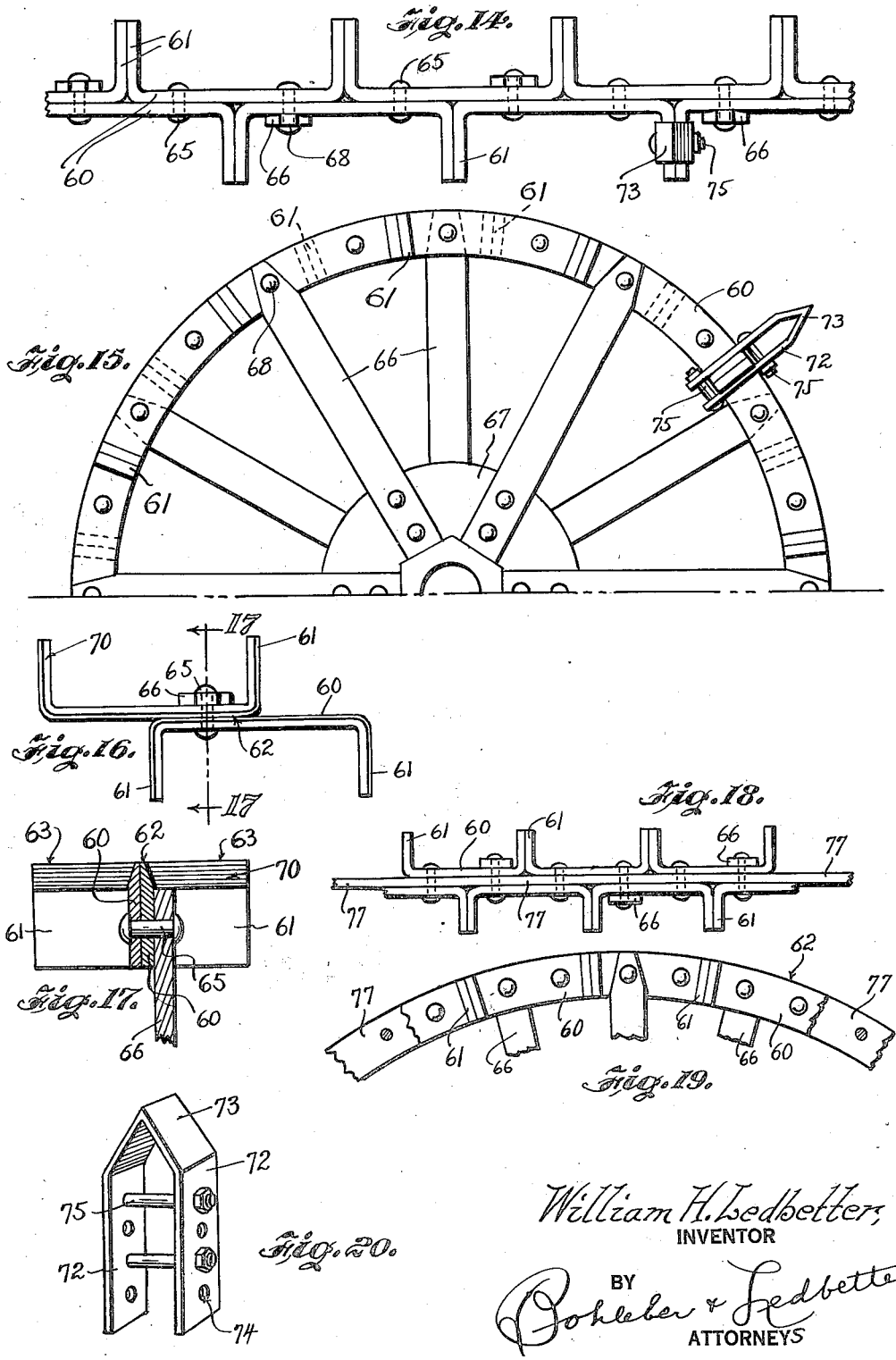

Patented June 18, 1935

2,005,550

UNITED STATES PATENT OFFICE 2,005,550

TRACTOR WHEEL

William H. Ledbetter, Dallas, Tex.

Application April 27, 1929, Serial No. 358,509

12 Claims. (Cl. 301—41)

This invention relates to a wheel for use on vehicles and the like but the wheel is adapted for other uses and more particularly the invention relates to tractor wheels.

An object of the invention is to produce a wheel, whether for tractors or other uses, which is novel, among other things, in its rim and traction lug construction. Furthermore a purpose is to produce a vehicle wheel, as for tractors, which is so constructed as to avoid clogging, choking or filling with earth despite the fact that the wheel possesses maximum traction or ground gripping and teeth means. To this end the invention affords an open rim or felloe with ground lugs or teeth so formed that the dirt tends to rapidly fall away from the wheel as the latter turns.

A further object is to produce a wheel rim or felloe construction which includes ground teeth or traction lugs of an improved form and which lugs have their one ends carried on the side surfaces of the wheel rim and the other ends of the teeth are free or unattached and project or stand out at an angle from the rim. In this way a wheel is produced, the tread face of which is smooth despite the fact that a large number of ground gripping teeth are provided.

In carrying out the aforementioned object of my invention having to do with the novel rim structure, I fabricate a rim from standard duplicate, or similar segments or sections any one or more of which, when damaged or bent, may be replaced with a new segment or section. In this connection it is a further object to produce rim segments or sections which may include ground gripping or traction teeth; and the overlapping segments alone, or with additional tread means, form a wheel the tread of which comprises a double, triple or multiple ply construction.

A further general object is to produce a tractor wheel, the lugs or ground teeth of which are substantially flush with the tread face of the wheel or at least do not project therebeyond so as to avoid digging into and damaging the surface of a road or drive when the tractor wheel rolls in contact therewith. In this connection, it is also a purpose to produce a wheel rim substantially thin at its outer face so that the wheel will cut or sink into the earth sufficiently deep to cause the ground gripping teeth or lugs to secure a substantially firm purchase or hold in the earth to gain maximum tractive effort.

A further object is to produce a wheel construction including a rim means carrying free-end outstanding traction teeth the outer tread faces of which are flush with or in the same peripheral plane or defined by the same radius as the rim means, and the side faces of the free-end teeth are formed to be in the plane of the wheel radius or in the spoke plane; and the rim means and teeth structure preferably are fabricated in part or entirely from iron bar stock.

The accompanying drawings illustrate several concrete embodiments of the invention serving to show the principles thereof and it is to be understood that changes in construction and use may be resorted to without departing from the scope of the invention.

All examples of the invention shown include what may be called outside free end ground teeth lying in the circle of the wheel radius and which afford maximum traction in that they cut into the ground but they are formed to run free of clogging and balling up with mud and dirt and they do not damage the road surface because the tread faces of the ground teeth do not project beyond the tread face of the wheel rim.

Figures 1 through 8 illustrate one form of the invention showing a double rim or felloe construction and attachments therefor.

Figure 1 shows an edge or tread face view of the double rim wheel, as for example a tractor wheel, stretched out in diagrammatic plan form; and Figure 2 shows a side view of a fragment of this wheel. Both views show different positions of auxiliary ground gripping teeth which may be changed and adjusted to meet all conditions.

Figure 3 shows an edge view of one of the segments used in building up this type of wheel; and Figure 4 is an end view thereof. A plurality of these parts are assembled and anchored together to make a complete wheel.

Figure 5 shows a tread face filler section or rim plate adapted to be inserted between the double rim or felloe to produce a closed or solid face wheel.

Figure 6 shows one form of auxiliary traction lug or ground tooth used on a double rim wheel of the type built up from segments shown in Figures 3 and 4, and this tooth functions in the well known way since it projects beyond the tread face of the wheel, but other ground teeth of a more preferred form to be described are disposed on the same radius as the tread face and hence will not damage a road when the tractor travels thereon.

Figure 7 shows an auxiliary ground tooth made from angle iron and Figure 8 is one made from flat bar stock. Both forms of teeth are well adapted to the wheel shown in Figures 1 and 2 and work on a greater radius than the tread face of the wheel.

Figures 9 through 13 show another form of the invention wherein a single rim wheel is fabricated from ring or rim segments which may have outturned traction lugs so disposed as to leave smooth the tread face of the wheel.

Figure 9 shows a plan, edge or tread face view of the single rim wheel laid out in diagrammatic form; and Figure 10 is a side view of a fragment of the complete wheel.

Figure 11 is a view of a segment from which this type of wheel is constructed.

Figures 12 and 13 illustrate different types of auxiliary traction or ground teeth, the first being a flush tread face free end type of tooth, and the latter being a projecting type of ground tooth.

Figures 14 through 17 illustrate a third modified form of wheel construction fabricated from another form of rim segment to build up a wheel shown in single rim form but which may be used for double rims if desired.

Figure 14 is a plan diagram looking at the tread face; and Figure 15 shows a side view of this wheel.

Figure 16 shows two of the rim segments joined together illustrating the method of fabricating this type of wheel; and Figure 17 is a cross sectional view taken on the line 17—17. These two views show the tread face of rim segments bevelled or sharpened so the wheel will sink into the ground and hence cause the ground teeth to dig in to obtain better traction.

Figures 18 and 19 show a fourth form of the invention wherein a segmentally constructed wheel of single rim form is assembled upon a continuous or solid ring, Figure 18 being an edge or tread face view, and Figure 19 being a side view. This form is just as well adapted to multiple rim wheels, one example of which is shown in Figures 1 and 2.

Figure 20 shows a perspective view of an auxiliary ground tooth used as a traction lug on several types of the wheels and one of these teeth is shown mounted in operative position in Figures 14 and 15.

Describing in further detail, first that form of the invention shown in Figures 1 through 8, it is observed that I have produced a double rim means or felloe wheel assembly made of standard rim segments and the wheel is of open face formation so the dirt tending to accumulate on the wheel will fall away as the wheel turns. This type of wheel is particularly useful for heavy tractors and is novel, among other things, in its segmental construction and its outstanding free end ground teeth.

The segment from which this double rim segment type wheel is built is simple in construction and includes a transverse portion or ground gripper bar 5 carried between spaced parallel rim segment portions 6 which are extended circumferentially on a radius of proper length to produce the correct wheel diameter and the sections terminate in free end outturned lugs forming ground lugs or teeth 7. Each lug 7 may be provided with a hole 8 to receive and anchor an auxiliary ground tooth of any suitable construction, examples of which are shown in Figures 7 and 8. The ground teeth 7 may be called flush tread face free end teeth since they do not project above or beyond the tread edge or face of the wheel and since their outer ends are free and not attached to a rim; and the front and rear faces of the teeth lie in or substantially parallel to the spoke plane or wheel radius.

The segmental rim member 5—6 shown in Figure 3 is merely an example of one form of construction and serves to illustrate the principles of that concrete embodiment of the invention shown as the first form. In some instances, the circumferential portion 6 is swedged or bent outwardly to form an offset 10 in the circular portion 6 for the reception of the adjacent mating segment of like construction to be anchored thereto. The segmental member shown in Figures 3 and 4 may be constructed from a single bar and is arched or curved on a radius conforming to the size of the wheel and the transverse distance between the parallel rims 6 is made to equal the width desired for the wheel. The cross tread bar 5 is disposed at any suitable angle to the parallel rims 6. The segment bar 5—6 and its teeth 7 may be set edgewise to the ground so as to secure effective penetration thereof into the earth.

As shown in the assembly views, the curved rim segments or rim means 6 may be corrugated or grooved at 12 so as to produce a rigid interfitting segmental joint when the parts are assembled. As in Figure 1, the grooved formation 12 may be used in some of these wheels, whereas in Figures 3 and 4 this grooved or corrugated design is omitted.

In producing a wheel from bar segments 5—6 of this general shape, a number thereof are riveted together to complete the rim circle. Rivets, bolts or other anchorage means 14 are employed, or the joints are welded if desired. The anchorage means 14 connect the two ends of a segment 5—6 to the inner portions of the rim 6 next to the transverse bar 5. In other words the anchorage means 14 join together the adjacent segments at their extremities and adjacent their transverse tread cross bars forming the ground grippers 5.

Spokes 16 radiate from a hub 17 and double or single rivet anchorage means 18 secure the outer ends of the spokes 16 to the rims 6, as by overlapping the spokes over the overlapped segments. In some forms of construction as shown in Figure 1, the spokes 16 may be fluted or corrugated as at 12 to conform to the similar grooves 12 made in the segments 5—6. This fluted form 12 provides a positive interlocking connection between the three overlapped portions to produce a rigid fabricated construction and avoids any possibility of displacement between the parts, although the spoke rivets 18 are alone adequate to secure the parts together. Furthermore the spokes are stiffened throughout their length by fluting them at 12 and this may be done for all or any portion of the spoke length.

The transverse ground grippers or tread portions 5 may be formed with holes 20 for the reception of bolts 21 used to attach auxiliary ground teeth 22 which are bolted to the transverse bars 5 and project above the tread surface of the wheel to provide additional traction means required for certain work. The teeth 22 are curved to conform to the curve of the bar 5.

In Figure 5 there is shown a tread plate 24, a plurality of which are adapted to close this open face wheel and produce a solid rim structure to travel on roads and the like. This tread plate comprises a face 24 having inturned parallel flanges 25 formed with bolt holes 26. The tread plates 24 fit between the two parallel tread bars 5 and rims 6 and are anchored in place by bolts 27 to close the open face wheel and are easily removed. The tread plate 24 is fashioned from sheet metal and its face is curved on a radius conforming to that of the rim segments 6. Ordinarily a pair of bolts 27 are sufficient to extend through the flanges 25 of two adjacent tread plates placed on each side of the transverse tread bar 5 and thus anchor the adjacent ends of the plates to the wheel by one set of bolts.

A feature of the wheel relates to the outturned lugs 7 made on one or both ends of the segments 5—6. Since the lugs 7 are a continuation of each rim segment 6, the tread faces or edges of the lugs 7 are flush with the tread faces of the segments 6. Thus the lugs 7 have tread faces in the same peripheral line and on the same radius as the tread of the rims 6. Therefore the lugs 7 do not dig into and damage the surface of a road or pavement when the tractor is crossing or travelling thereon, and the toothed wheel easily rolls on a hard road without jolting and jarring the tractor.

The parallel rim segments 6 are made from suitable bar stock of substantially thin form so the wheel will sink into the earth when plowing or performing other work requiring effective traction. The thin rim segments 6 enable the double rim to penetrate the surface of the soil as the wheel rolls along the ground and the outwardly directed free end lugs 7 establish a positive hold in the ground to prevent the wheel from slipping when the tractor is pulling in the soft ground. The ground teeth have their inner ends carried on the side of the rim and their outer ends are free which produces a dirt shredding construction. A feature of the construction also resides in the position of the free-end teeth 7 with their faces parallel to or in the wheel radii.

Since the outer ends of the lugs 7 are free and unattached to a rim, the dirt rapidly falls away therefrom as it tends to build up on the wheel. While dirt or mud may collect within the open faced wheel construction between the parallel rims 6 and transverse bars 5, this is not true of the outer part of the wheel adjacent the free end lugs 7 for the reason that the outer lug ends being free and unattached to a rim, the dirt which accumulates has no adjacent rim portion to which it may adhere and hence drops off. Freed of the rim obstruction, there is less opportunity for the dirt to build and fill in the open wheel spaces about the teeth 7.

In Figure 7 there is shown an auxiliary traction lug tooth which may be used on the tractor wheel when it is fitted up for heavy going requiring extra tractive effort. This angle bar ground tooth 33 is well suited for heavy duty work since it includes angular portions 31 and 32 which establish a rigidly braced construction when mounted as shown at 33 in Figure 1. It rests in a corner formed by an intersecting lug 7 and rim segment 6 and is anchored to one or both of these parts by a bolt 34. This tooth is made with a number of holes 35 and hence it is adjustable outwardly or inwardly to increase or decrease the length of the tooth projecting from the tread face of the wheel. Furthermore this tooth 33 may be inverted so as to extend its point towards the hub 17 and thus conveniently carry it on the wheel out of the way when not in use.

In Figure 8 there is shown another ground lug in the form of a flat bar tooth 36 which may be pointed and provided with holes 37. This tooth is also adjustable in and out on the lugs 7 to which it is fastened by bolts. The tooth 36 is shown in both positions in Figures 1 and 2 where it is readily seen just how the tooth is turned inwardly when not in use and how it is mounted with its point projecting outwardly in an adjustable manner when in use.

Coming now to a description of that form of the wheel invention shown in Figures 9 through 13, it is observed that this type of wheel is of single rim construction and is built up from standard felloe or rim sections or segments one of which is shown in perspective in Figure 11 and which includes a flush tread and free end type of ground tooth at one or both ends thereof.

The segment for producing this form of wheel includes a curved bar 40 set edgewise and offset at 41 producing parallel portions 40 and 42. The bend 41 is swedged into the bar to produce an offset at about the central portion thereof equal to substantially the thickness of the bar. Each end of this segment is made with an outturned free end ground tooth 43 or 44. Rivet or bolt holes 45 are punched in the segmental bar near its ends adjacent the teeth 43 and 44. This edgewisely disposed bar is curved on a radius equal to that of the wheel to be produced and hence its tread face designated at 46 forms a similar tread face 47 on the outturned lugs or ground teeth 43 and 44. In other words the entire tread face 46—47, throughout the length of the segment 42—40, is smooth and a continuation of the edge or wheel periphery which rotates in contact with the ground because the two treads 46 and 47 are on the same radius.

A plurality of these rim segments 40—42 are anchored together with rivets, bolts or other anchorage means 49 or by welding. The outturned ground tooth 43 at one end of each segment projects outwardly from the rim 40—42 in a direction opposite to that of the other ground tooth 44 on the adjacent attached rim segment. It is significant that the tread face or ground engaging edge 46—47 is perfectly smooth and no projections extend thereabove to cut into or dent the surface of a road when the wheel is travelling along the road and furthermore the wheel rolls without vibration. The teeth 43 and 44 are carried on the side of the rim segments of the wheel and project free ended therefrom. One end or the inner end of the lug is attached to or integral with the side of the wheel rim but the other or outer end is free and detached from any wheel portion; and the parallel faces of the teeth 43 and 44 are disposed radially and lie in the direction of the wheel spokes or radii. The rim and teeth means are preferably constructed of iron bar stock.

Spokes 50 radiate from the hub 51 to support the fabricated rim. The spokes 50 are welded or otherwise secured as by rivets 52 to the rim 40—42 forming the wheel. While the spokes 50 are shown as being staggered against the outside faces of the built-up rim, alternately on both sides of the rim, they may be otherwise arranged as desired.

In Figure 12 there is shown an auxiliary extension ground tooth for increasing the tractive effort of the wheel. The tooth 53 has an upturned end to form a foot 54. Holes 55 are made in this tooth to anchor it to the wheel with bolts or rivets 56. These extension teeth 53 are substantially longer than the integral ground teeth 43 and 44 and are attached to the wheel when it is fitted up for heavy going where extra tractive effort is required. The ground teeth 53 are placed against the rim of the wheel and in the corner defined by the wheel rim and teeth 43 or 44. This extension tooth is also of the flush tread face and free end type.

In Figure 13 there is shown an angle iron tooth 57 having holes 58 for use in connection with the wheel shown in Figures 9 and 10. The several holes 58 provide means for adjusting the angle iron tooth 57 in and out relatively to the tread face 56 of the wheel. This tooth 57 can be reversed and projected inwardly to leave a smooth uninterrupted tread face. In this way it is conveniently carried on the wheel when it is not in use as already explained in connection with the tooth 33 for the wheel shown in Figures 1 and 2.

A description will now be given of that form of the invention shown in Figures 14 through 17 wherein another single rim segmental wheel is shown although it may be adapted to double rim construction. The rim of this wheel is fabricated from sections or segments of the shape shown in Figures 16 and 17 where two of the segments are connected together. This segment includes a circular portion 60 having outturned ends forming ground teeth 61 the faces of which lie in the same radius as that of the wheel. The teeth 61 are bent outwardly from the bar 60 in the same direction as distinguished from oppositely directed ground teeth 43 and 44 heretofore described. Each segment 60 has a smooth thin thread face 62—63 so the wheel will more readily sink into the ground.

The outturned ground teeth 61 are carried laterally of and project from the side of the segment 60 and hence the tread faces 63 of the ground teeth are also in the same plane or flush with the segment tread face 62. In this way the combined rim tread faces of the wheel, including the faces or edges of the segments 60 and the teeth 61, are smooth and have no projecting parts to dent, crack or damage a hard road surface by jolting on it, hence the advantage of this construction. The two adjacent teeth 61 form a double or multiple ply tooth.

A number, or two rows, of the segments 60 are joined together in multiple ply form with the ground teeth 61 pointed laterally outwardly thereby placing the smooth sides of the segments together in abutting manner as shown. Rivets 65 anchor the abutting segments together and the ground teeth 61 on the adjacent ends of the segment fit closely together to reenforce each other. Rivets may also be passed through the abutting ground teeth to rigidly join them together if desired.

Spokes 66 radiate from a hub 67 and rivets 68 anchor the outer ends of the spokes to the segment rim 60. The spokes 66 may be staggered around and on opposite sides of the rim as shown or otherwise arranged. Any suitable spoke and hub assembly may be used with these wheels.

For some classes of wheels, bar material having a bevelled edge 70, as shown in Figures 16 and 17, may be used if desired to reduce the width of the tread face 62 and to produce a wheel which more readily sinks into the earth and enables the ground teeth 61 to secure a better purchase and hence afford great tractive effort.

A fourth form of wheel is shown in Figures 18 and 19 and is substantially the same as shown in Figures 14 and 15 except that a solid ring 77 is interposed between the two rows or lines of rim segments 60, and thus forms another multiple or triple ply construction. The solid ring 77 affords a base on which to assemble the segments 60 and outwardly from which projects the ground teeth 61. Spokes 66 are anchored to the rim 60—77. The tread face of the rim 77 may as well be flush with the tread faces 62 of the segments 60 and hence is smooth and uninterrupted by any parts such as projecting ground teeth or lugs of prevalent use in tractor wheels. The free-end teeth have their flat faces in or parallel to the wheel radius.

An outstanding feature of the wheels is that they are built so that they run free of clogging and balling up with dirt because of the free end flush type tread face ground teeth carried by and projecting from the wheels sides. Furthermore they may run on a road without damage thereto because the tread face is flush and smooth with the ground teeth. Also the segmentally built up rim may be easily repaired by removing broken or bent rim segments.

Figure 20 shows another form of ground tooth of the projecting type which may be used with the wheels shown in Figures 14, 18 and others. This ground tooth is fashioned from a single bar and includes parallel sides 72 and a point 73. Bolt holes 74 are provided for bolts 75. It is an advantage to punch a number of holes 74 in line so that the pair of bolts 75 may be placed in any of the holes desired to adjust the distance of the point 73 closer or further from the tread face of the rim. This tooth is shown mounted in position in Figures 14 and 15 and it is readily seen how the depth of penetration of the tooth 72 may be varied by changing the position of bolts 75 and by slipping the tooth further in or out in relation to the tread face of the different type wheels.

A noteworthy feature resides in the integral rim and teeth means, in that the rim and outstanding free-end teeth are formed of the same bar material. Although the teeth may be constructed of cast iron and then bolted onto the iron rim means, it is usually preferred to make the teeth and rim integral and of bar stock, the teeth having their working faces set radially or in the same direction as the wheel radius. The tread of the teeth and the tread of the rim means are also defined by the same radius.

What is claimed is:

1. A wheel including a rim fabricated from segments, the ends of each segment being bent outwardly in the same direction, the rim comprising a multiple ply construction made of abutting segments with their flat sides placed together and whose bent ends project outwardly from both sides of the rim to form outstanding teeth, and anchorage means to secure the segments together.

2. A wheel including a rim fabricated from segments, the ends of each segment being bent outwardly in the same direction, the rim consisting of a double row or two ply construction made of abutting segments with their flat sides placed together and whose bent ends project outwardly from both sides of the double row or two ply rim to form outstanding teeth, and the teeth on each side of the rim being placed together in abutting fashion to form two ply teeth.

3. In a wheel, a continuous ring forming a tread, segments fully overlapping and curved on the ring radius and attached to the ring thereby forming a multiple ply construction and ground teeth outturned at the ends of each segment, and said teeth being disposed in abutting relation to form a multiple ply tooth construction.

4. In a wheel, a continuous ring forming a tread face, rim segments attached to the ring and said segments having their tread faces substantially flush with the continuous ring tread face, the ring and segments forming the rim of the wheel, and each segment having each end bent outwardly therefrom to produce ground teeth having free ends outstanding from the rim.

5. A tractor wheel comprising a row of circumferentially spaced ground teeth made of flat bar stock, a rim and tread means formed of overlapping flat bar stock segments and having a flat side on which the inner ends of the teeth are carried, the outer ends of the teeth standing out freely from the rim and tread means; the radius of the outer tread edge of the rim, as well as the radius of the tread edge of the teeth, being the same so that the outer tread edges of both the rim and the teeth are flush and in the same circular line; said teeth being set edgewise and in the planes of the wheel radii, and means to secure the segments together.

6. A unitary wheel construction comprising a rim formed of overlapping segments made of iron bar stock set edgewise, wheel spokes fixed thereto, free-end teeth outturned on both ends of the segments and set flush with the rim, and means to secure the segments together.

7. A wheel rim comprising closely related overlapping segments curved to conform to the circumference of the wheel, said segments being formed of flat iron bar stock set edgewise, the segments fully overlapping each other whereby to bring together the ends of the successive segments to produce a multiple ply rim construction, the ends of the segments being outturned from the rim to form free-end teeth having tread faces on the same circumference as that of the rim, and the teeth of the segments of each ply abutting each other to form multiple ply teeth.

8. A wheel comprising a rim formed of flat overlapping bars set edgewise to present the narrow edges thereof to the earth as a thin tread means adapted to cut thru the ground surface, and traction teeth carried on the sides of the bars at the ends thereof and also made of flat bar stock set edgewise to present the narrow edges thereof to the earth as additional thin tread means also adapted to cut thru the ground surface, the traction teeth aforesaid being formed of multi ply construction by abutting a number of the aforementioned bars together to form said teeth.

9. A wheel comprising a rim formed of flat overlapping bars set edgewise to present the narrow edges thereof to the earth as a thin tread means adapted to cut thru the ground surface, traction teeth carried on the sides of the bars at the ends thereof and also made of flat bar stock edgewise to present the narrow edges thereof to the earth as additional thin tread means also adapted to cut thru the ground surface, the traction teeth aforesaid being formed of multi ply construction by abutting a number of the aforementioned bars together to form said teeth, and one of the aforementioned bars being longer than the abutting bar by which the teeth are of multi ply construction for a part of their length and single ply construction throughout their remaining length.

10. A wheel comprising a rim formed of flat bar stock set edgewise to present a thin tread surface to the ground, said bar stock being swedged to form offsets at intervals, said offsets being about equal to the thickness of the bar, and teeth made of flat bar stock also set edgewise and carried on the rim at the swedged and offset portions and projecting outwardly from the rim.

11. A wheel comprising a rim formed of flat overlapping bars set edgewise to present the narrow edges thereof to the earth as a thin tread means adapted to cut thru the ground surface, traction teeth carried on the sides of the wheel rim at the ends of the bars and also made of flat bar stock set edgewise to present the narrow edges thereof to the earth as additional thin tread means which is also adapted to cut thru the ground surface, the traction teeth aforesaid being formed of multi-ply construction by abutting a number of bars together to form said teeth, and one of the aforementioned teeth being longer than its abutting tooth so that the teeth are of multi-ply construction for a part of their length and single-ply construction throughout their remaining length.

12. A tractor wheel comprising a relatively narrow rim formed of flat bar stock set edgewise with its thin peripheral tread presented to the ground, including spaced spokes forming an open wheel the tread of which will normally penetrate the ground a distance deeper than the radial width of the rim, traction teeth made of the same bar stock material as the rim, said teeth carried on at least one side of the wheel rim and projecting sidewardly therefrom, both the teeth and rim having flush treads formed on the same peripheral line; and auxiliary teeth carried on the traction teeth and adjustable in position thereupon, said auxiliary teeth projecting beyond the periphery of the rim and its traction teeth for use in deep loose soil, and said auxiliary teeth being movable in relation to the rim and sidewardly projecting traction teeth to adapt the wheel to roll thereon when used for road travel.

WILLIAM H. LEDBETTER.